(12) United States Patent
Wu et al.

(10) Patent No.: US 10,489,164 B2
(45) Date of Patent: Nov. 26, 2019

(54) APPARATUSES FOR ENQUEUING KERNELS ON A DEVICE-SIDE

(71) Applicant: VIA Alliance Semiconductor Co., Ltd., Shanghai (CN)

(72) Inventors: Fengxia Wu, Shanghai (CN); Tian Shen, Shanghai (CN); Zhou Hong, Cupertino, CA (US); Yuanfeng Wang, Shanghai (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 16/403,977

(22) Filed: May 6, 2019

(65) Prior Publication Data

US 2019/0258492 A1  Aug. 22, 2019

Related U.S. Application Data

(62) Division of application No. 15/171,388, filed on Jun. 2, 2016, now Pat. No. 10,394,574.

(30) Foreign Application Priority Data

Dec. 4, 2015  (CN) .......................... 2015 1 0885446

(51) Int. Cl.
*G06F 9/445* (2018.01)
*G06F 9/38* (2018.01)

(52) U.S. Cl.
CPC ............ *G06F 9/445* (2013.01); *G06F 9/3851* (2013.01); *G06F 9/44521* (2013.01)

(58) Field of Classification Search
None
See application file for complete search history.

(56) References Cited

U.S. PATENT DOCUMENTS

| | | | |
|---|---|---|---|
| 6,587,746 B1 | 7/2003 | D'Souza | |
| 7,167,974 B2 | 1/2007 | Roth et al. | |
| 8,514,874 B2 | 8/2013 | Mital et al. | |
| 8,817,029 B2 | 8/2014 | Rothers et al. | |
| 2007/0255894 A1* | 11/2007 | Hessel | G06F 9/30036 711/105 |
| 2007/0283356 A1 | 12/2007 | Du et al. | |
| 2008/0270744 A1 | 10/2008 | Hashimoto | |
| 2012/0147021 A1 | 6/2012 | Cheng et al. | |
| 2015/0022538 A1 | 1/2015 | Munshi | |
| 2017/0070363 A1 | 3/2017 | Watkins et al. | |

FOREIGN PATENT DOCUMENTS

TW          200717311 A       5/2007

* cited by examiner

*Primary Examiner* — Yanna Wu
(74) *Attorney, Agent, or Firm* — McClure, Qualey & Rodack, LLP

(57) ABSTRACT

An apparatus for enqueuing kernels on a device-side is introduced to incorporate with at least a MXU (Memory Access Unit) and a CSP (Command Stream Processor): The CSP, after receiving a first command from the MXU, executes commands of a ring buffer, thereby enabling an EU (Execution Unit) to direct the MXU to allocate space of the ring buffer for a first hardware thread and subsequently write second commands of the first hardware thread into the allocated space of the ring buffer according to an instruction of a kernel.

4 Claims, 3 Drawing Sheets

APPARATUSES FOR ENQUEUING KERNELS ON A DEVICE-SIDE

CROSS REFERENCE TO RELATED APPLICATIONS

This application is a Divisional of pending U.S. patent application Ser. No. 15/171,388, filed on Jun. 2, 2016, which claims the benefit of China Patent Application No. 201510885446.1, filed on Dec. 4, 2015, the entirety of which is incorporated by reference herein.

BACKGROUND

Technical Field

The present invention relates to a GPU (Graphics Processing Unit), and in particular, it relates to apparatuses for enqueuing kernels on a device-side.

Description of the Related Art

A host-side enqueues a kernel to direct a device-side to execute. Conventionally, after the kernel is executed completely, the device-side returns control to the host-side. Then, the host-side enqueues another kernel to be executed. However, it consumes certain levels of overhead to undermine performance. Thus, apparatuses for enqueuing kernels on a device-side are introduced to address the drawbacks.

BRIEF SUMMARY

An apparatus for enqueuing kernels on a device-side is introduced to incorporate with at least a MXU (Memory Access Unit) and a CSP (Command Stream Processor): The CSP, after receiving a first command from the MXU, executes commands of a ring buffer, thereby enabling an EU (Execution Unit) to direct the MXU to allocate space of the ring buffer for a first hardware thread and subsequently write second commands of the first hardware thread into the allocated space of the ring buffer according to an instruction of a kernel.

An apparatus for enqueuing kernels on a device-side is introduced to incorporate with at least a CSP and a MXU: The MXU is coupled to the CSP and a video memory and at least contains a PID (Physical-thread ID) buffer. The video memory at least contains several ring buffers. The MXU allocates space of the ring buffer for a first hardware thread of a kernel according to a first instruction, and stores a profile of the first hardware thread in the PID buffer. The profile at least contains a thread ID, a tail address of the allocated space and a ready flag indicating that a plurality of first commands of the first hardware thread are not ready.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, it should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
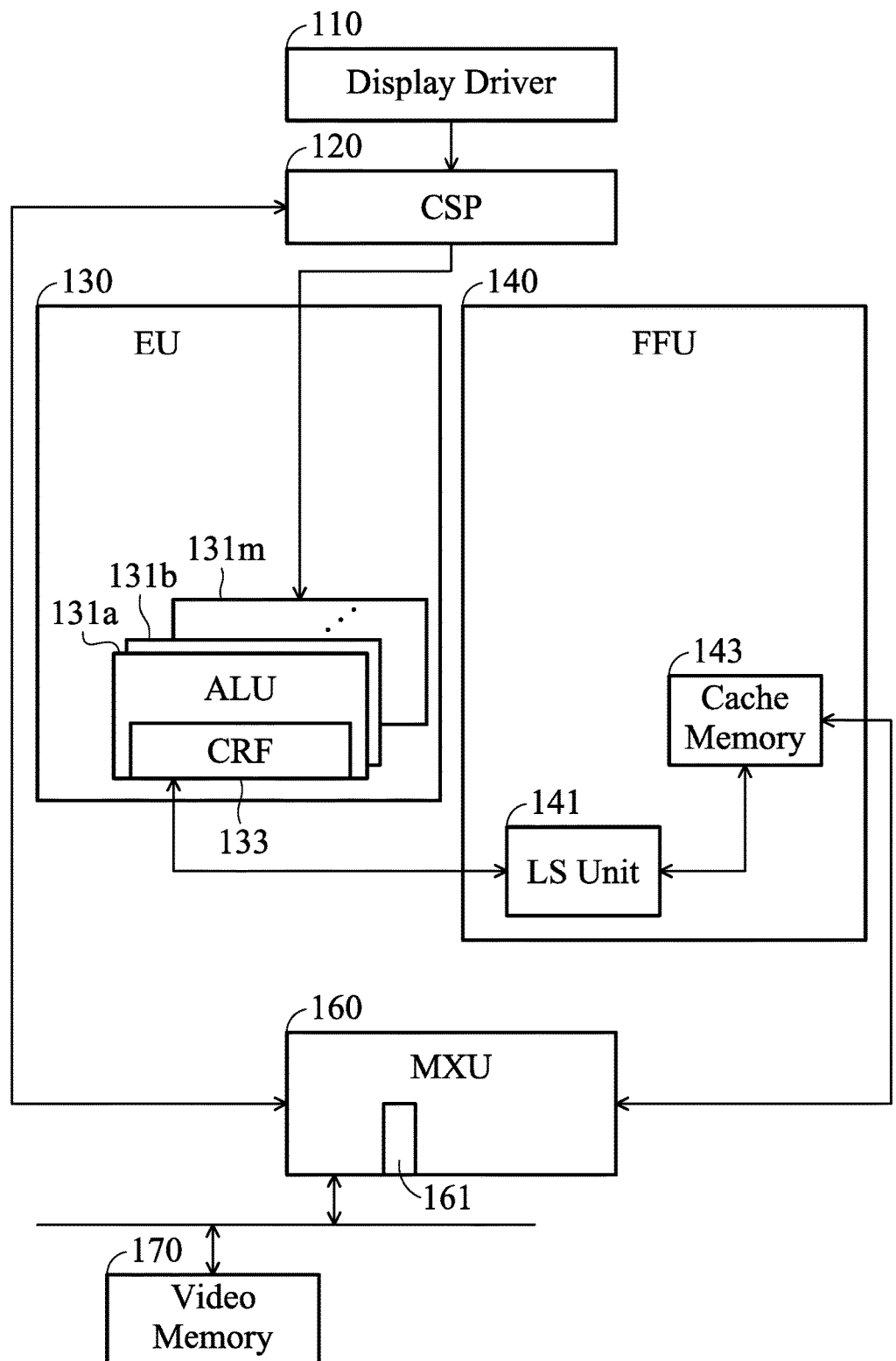
FIG. 1 is the hardware architecture illustrating a graphics-processing device according to an embodiment of the invention.
Figure 2:
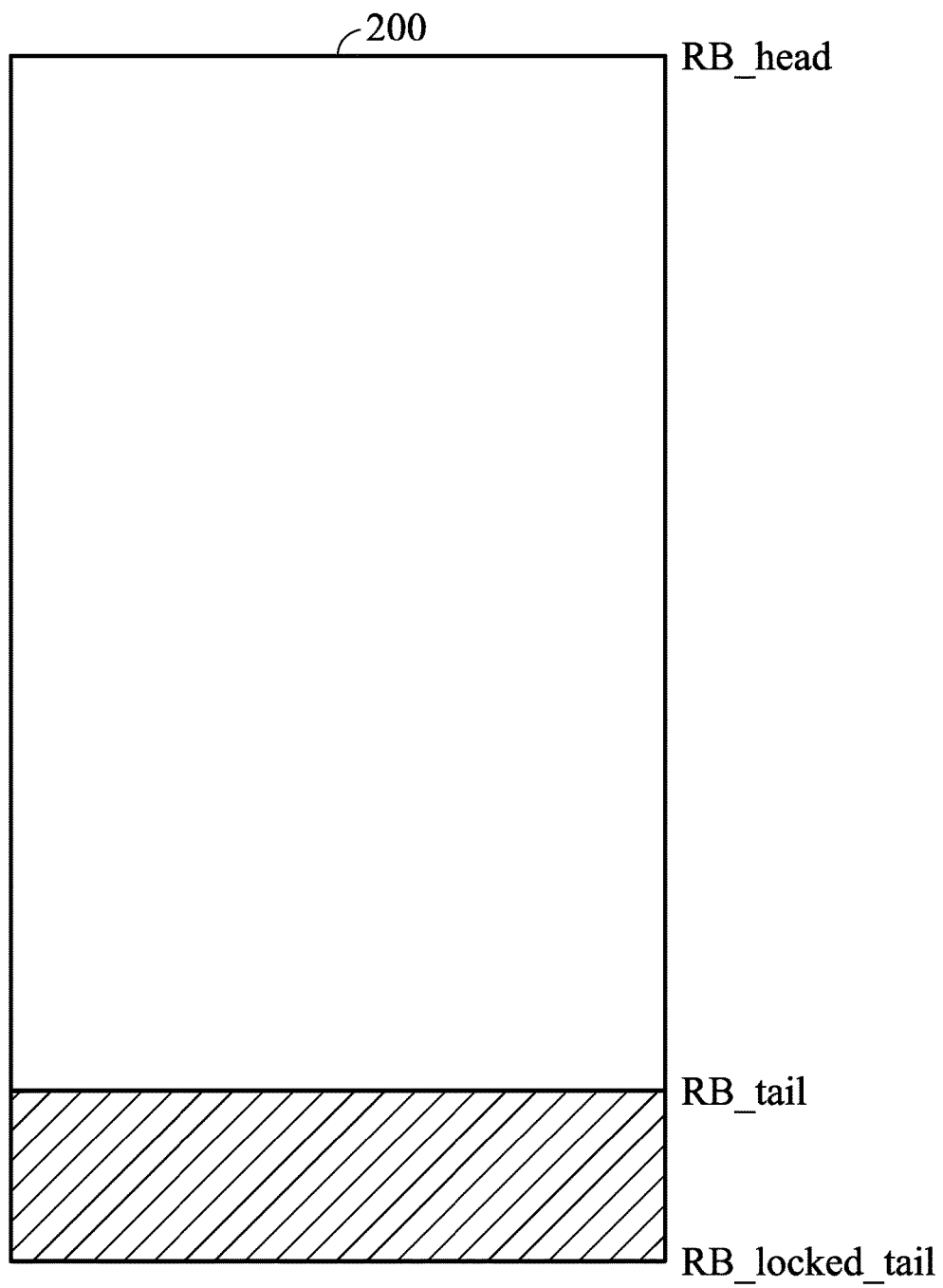
FIG. 2 is a schematic diagram illustrating a ring buffer according to an embodiment of the invention.

FIG. 1 is the hardware architecture illustrating a graphics-processing device according to an embodiment of the invention. A kernel is a function declared in a program and executed on a graphics-processing device. The work carried out by a graphics-processing program occurs through the execution of kernel-instances on the graphics-processing device. The hardware architecture provides a mechanism whereby a kernel-instance is enqueued by a kernel-instance running on a graphics-processing device without direct involvement by the host-side. It produces nested parallelism; i.e. additional levels of concurrency are nested inside a running kernel-instance. The kernel-instance executing on a device-side (the parent kernel) enqueues a kernel-instance (the child kernel) to a device-side ring buffer. Child and parent kernels execute asynchronously though a parent kernel does not complete until all of its child-kernels have completed. A kernel may be referred to as a compute shader in similar domain. A compute shader is a separate logical shader type analogous to the current graphics shaders, such as the vertex, geometry, pixel shaders, etc. Its purpose is to enable more general processing operations than those enabled by the graphics shaders. The video memory 170 allocates a portion of space for a ring buffer, such as 64 Mbytes. FIG. 2 is a schematic diagram illustrating a ring buffer according to an embodiment of the invention. Three pointers are used to point to addresses of the head, the tail and the locked tail of the ring buffer 200, "RB_head", "RB_tail" and "RB_locked_tail", respectively. The ring buffer 200 contains memory space from the address "RB_head" to the address "RB_locked_tail". Specification, the ring buffer 200 may be shared by multiple kernels. The video memory 170 may allocate space of the ring buffer 20 for thread groups associated with the kernels. Each thread group may contain multiple threads, such as 16×16×16 threads (also referred to as a software thread group). The EU 130 packs a predefined number of software threads in a hardware thread, which can be processed in parallel, such as 32 software threads, also referred to as SIMD (Single Instruction Multiple Data) threads. The ring buffer 200 may at most store a predefined number of hardware threads, such as 96 hardware threads.

The display driver 110 issues a command to the CSP (Command Stream Processor) 120 for generating a kernel dispatch command of one kernel-instance, referred to as the host-side-enqueued kernel. The EU 130 divides the kernel dispatch command of one kernel-instance into multiple hardware threads, each of which contains a predefined number of the software threads, such as 32 software threads, and each software thread contains one kernel dispatch command for generating one child-kernel-instance, also referred to as the device-side-enqueued kernel. That is, the display driver 110 activates the very first kernel, and then, the device-side generates descendant kernels. The EU 130 contains multiple ALUs (Arithmetic Logic Units) 131a to 131m and each ALU contains a CRF (Common Register File) 133, where m may be 32. The CSP 120 directs the EU 130 for generating a hardware thread according to a command sent by the MXU (memory access unit) 160 or an instruction sent by the display driver 110. Specifically, the hardware thread may instruct the MXU 160 to allocate space of the ring buffer 200 for one hardware thread. The instruction for allocating space of the ring buffer 200 must be an atomic instruction to ensure that the space allocation cannot be interrupted by any other instruction. In addition, for recording the order of the hardware threads being pushed into the ring buffer 200, the MXU 160 contains the PID (Physical-thread ID) buffer 161 for sequentially storing profiles of hardware threads of the ring buffer 200, each of which includes a thread ID (identifier), a tail address, a ready flag "bReady", etc. The thread ID is used to identify the hardware thread, the tail address is the last address of the allocated space, and the ready flag is initiated as "0" to indicate that the command associated with this hardware thread has not been ready. In space allocation, the MXU 160 further determines whether it is required to allocate space from the head address of the ring buffer "RB_head". Specifically, the MXU 160 determines whether the tail address of the last hardware thread of the PID buffer 161 equals or exceeds the tail address of the ring buffer "RB_tail". If so, the space allocation begins with the head address "RB_head"; otherwise, the space allocation begins with the next address of the tail address of the last hardware thread.

Subsequently, the EU 130 sets the CRF of the ALU for directing the EU 130 to write n commands in the allocated space of the ring buffer 200 through the MXU 160, for example, n=32, and each command is used to generate a kernel dispatch command of one kernel-instance. The setting values of the CRF 133 are associated with a non-cacheable UAV (Un-order Accessed View) store instruction to write n commands into the allocated space of the ring buffer 200 directly, instead of storing the commands in a cache memory temporarily. It should be noted that, once the ring buffer 200 has allocated space completely, the commands should be written into the ring buffer 200 immediately, rather than staying in the cache memory. Otherwise, an execution error of the ring buffer may occur. The FFU (Fixed Function Unit) 140 contains the LS (Load/Store) unit 141. The EU 130 directs the LS unit 141 to read n commands of the hardware thread, and next, the LS unit 141 directs the MXU 160 to write the n commands into the allocated space of the ring buffer 200 through the cache memory 143. When the MXU 160 is directed to write the last command of the hardware thread, the EU 130 further issues a signal "thread_end" to indicate that the specific hardware thread has been executed completely. When detecting the signal "thread_end", the MXU 160 sets the ready flag of the PID 161 to "1", corresponding to this hardware thread, to indicate that the hardware thread has written all commands into the ring buffer 200 completely. Although the embodiments of the invention describes that the existing LS unit 141 and the existing cache memory 143 of the FFU 140 are used to achieve the command reads and writes, those skilled in the art may realize functionality analogous to the LS unit 141 and the cache memory 143 in the EU 130 and the invention should not be limited thereto.

The MXU 160 periodically exams the PID buffer 161 to determine whether all commands of the hardware thread on the top of the ring buffer 200 are ready. If so, the MXU 160 writes the head and tail addresses corresponding to the top hardware thread into a MMIO (Memory Mapping Input/Output) register of the CSP 120 to direct the CSP 120 to reads all commands of the hardware thread on the top of the ring buffer 200 and execute these commands. Each command directs the CSP 120 to generate a kernel dispatch command for one kernel-instance (that is, a kernel dispatch command). The aforementioned technique may be referred to as a hardware thread kick-off. Next, the MXU 160 removes the profile of the kicked-off hardware thread from the PID buffer 161. It should be noted that the MXU 160 does not activate any hardware thread when the commands of the very first hardware thread of the ring buffer 200 are not ready completely although all commands of the hardware thread, which is initiated later than the first hardware thread, are ready, so as to ensure the hardware threads to be executed following the original initiation order.

It should be noted that the EU 130 has no knowledge for operating the ring buffer 200 but commissions the MXU 160 to complete the operations. For the MXU 160 is the controller for operating the video memory 170, it can improve the efficiency to enqueue kernels when the logic for operating the ring buffer 200 is placed in the MXU 160.

Figure 3:
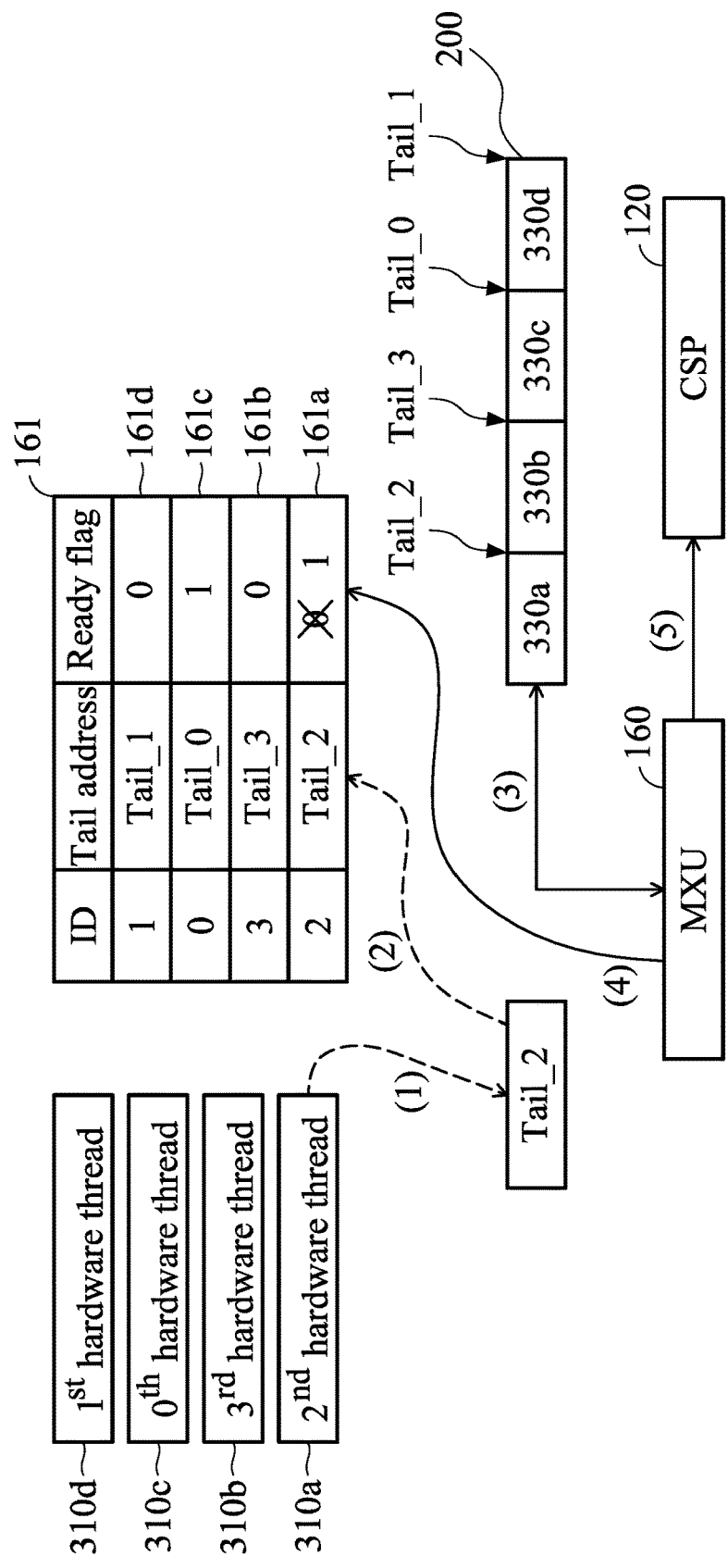
FIG. 3 is a schematic diagram of a device-side enqueue according to an embodiment of the invention.

FIG. 3 is a schematic diagram of a device-side enqueue according to an embodiment of the invention. Assume the EU 130 generates four hardware threads 310a to 310d and each hardware thread when being executed writes n commands into allocated space of the ring buffer 200: First, the MXU 160 requests the video memory 170 to allocate space 330a to 330d of the ring buffer 200 for the hardware threads 310a to 310d. The requesting order is the second hardware thread 310a followed by the third hardware thread 310b followed by the zero-th hardware thread 310c followed by the first hardware thread 310d. After the space has been allocated successfully, the video memory 170 replies to the MXU 160 with the tail addresses Tail_2, Tail_3, Tail_0 and Tail_1 and stores profiles 161a to 161d of the hardware threads into the PID buffer 161, such as hardware IDs, the replied tail addresses, the ready flags, etc. The ready flags are initiated by "0" to indicate that the corresponding hardware threads have not been executed completely. For example the MXU 160, as shown in step (1), requests the video memory 170 to allocate space 330a for the hardware thread 310a and obtains the tail address Tail_2, and, as shown in step (2), stores the profile 161a of the hardware thread 310a into the PID buffer 161. Later, after completely writing n commands of the zero-th hardware thread 310c, the MXU 160 updates the ready flag of the profile 161c with "1" to indicate that the zero-th hardware thread 310c is ready. However, in order to ensure that the command execution sequence follows the original initiation sequence, the n commands, which have been written into the space 330c, cannot be executed because the commands of the second hardware thread 310a and the third hardware thread 310b are not completely ready.

As shown in step (3), the MXU 160 writes n commands of the second hardware thread 310*a* into the ring buffer 200. After the n commands of the second hardware thread 310*a* are written completely, as shown in step (4), the ready flag of the profile 161*a* is updated with "1" to indicate that the second hardware thread 310*a* is ready. Finally, as shown in step (5), the MXU 160 writes current thread's RB head and tail into the MMIO register of the CSP 120 to direct the CSP 120 to read all commands of the second hardware thread 310*a* from the ring buffer 200 and execute these commands.

Although the embodiments have been described in FIG. 1 as having specific elements, it should be noted that additional elements may be included to achieve better performance without departing from the spirit of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for enqueuing kernels on a device-side, comprising:
    a MXU (Memory Access Unit); and
    a CSP (Command Stream Processor), coupled to the MXU, after receiving a first command from the MXU, executing commands of a ring buffer, thereby enabling an EU (Execution Unit) to direct the MXU to allocate space of the ring buffer for a first hardware thread and subsequently write a plurality of second commands of the first hardware thread into the allocated space of the ring buffer according to an instruction of a kernel;
    wherein the plurality of second commands of the first hardware thread are written into the allocated space of the ring buffer by setting a value of a CRF (Common Register File) of an ALU (Arithmetic Logic Unit), and the set value of the CRF is associated with a non-cacheable UAV (Un-order Accessed View) store instruction to write the plurality of second commands into the allocated space of the ring buffer directly, instead of storing the plurality of second commands in a cache memory temporarily.

2. The apparatus of claim 1, further comprising:
    the EU, after directing the MXU to write a last second command, issuing a signal to the MXU to indicate that the first hardware thread has been executed completely.

3. The apparatus of claim 1, wherein each second command directs the CSP to generate a command for generating a child-kernel-instance of the kernel.

4. The apparatus of claim 1, wherein an atomic instruction is used to direct the MXU to allocate the space of the ring buffer for the first hardware thread.

* * * * *